(12) United States Patent
Tachibana

(10) Patent No.: US 9,027,882 B2
(45) Date of Patent: May 12, 2015

(54) AIRFRAME OF AIRCRAFT, PANEL ASSEMBLY FOR AIRCRAFT

(71) Applicant: Mitsubishi Aircraft Corporation, Aichi (JP)

(72) Inventor: Kazuki Tachibana, Aichi (JP)

(73) Assignee: Mitsubishi Aircraft Corporation, Aichi (JP)

( * ) Notice: Subject to any disclaimer, the term of this patent is extended or adjusted under 35 U.S.C. 154(b) by 485 days.

(21) Appl. No.: 13/737,122

(22) Filed: Jan. 9, 2013

(65) Prior Publication Data

US 2013/0180176 A1 Jul. 18, 2013

(30) Foreign Application Priority Data

Jan. 13, 2012 (JP) ................. 2012-005429

(51) Int. Cl.
*B64C 1/14* (2006.01)
(52) U.S. Cl.
CPC ................. *B64C 1/14* (2013.01); *B64C 1/1446* (2013.01)

(58) Field of Classification Search
CPC ...... B64C 1/14; B64C 1/1407; B64C 1/1446; B64C 1/1461
See application file for complete search history.

(56) References Cited

U.S. PATENT DOCUMENTS 4,530,443 A 7/1985 Gorges
4,579,248 A 4/1986 Gorges

*Primary Examiner* — Philip J Bonzell
(74) *Attorney, Agent, or Firm* — Pearne & Gordon LLP

(57) ABSTRACT

The present invention prevents misassembly of access doors while reducing stress concentrations. A hole-side convex portion 80 is formed in each opening 12 at one or more locations in a circumferential direction, and a door-side rib 70 is formed on each door body 30. The hole-side convex portions 80 formed in the openings 12A to 12C differ in location in the circumferential direction among the plural openings 12A to 12C. The door-side ribs 70 formed on the respective door bodies 30A to 30C are provided in such locations as not to interfere with the hole-side convex portions 80 provided in the openings 12A to 12C in correct combination with the door bodies 30A to 30C.

9 Claims, 8 Drawing Sheets

AIRFRAME OF AIRCRAFT, PANEL ASSEMBLY FOR AIRCRAFT

BACKGROUND OF THE INVENTION

1. Field of the Invention

The present invention relates to an airframe of an aircraft and a panel assembly for an aircraft.

2. Description of the Related Art

Each main wing of an aircraft has a hollow structure, as wing panels which form wing surfaces are mounted on top and bottom of spars. Generally, inner space of such a main wing is used as fuel tanks.

For inspection and maintenance operations inside of the fuel tanks, openings are formed in a surface of the main wing. The openings are normally closed by access doors and the access doors are opened in the case of inspection and maintenance operations.

Each access door is made up of a door body placed on an inner-space side of the main wing with respect to the opening and a clamp ring placed on an outer side of the main wing.

Both door body and clamp ring have outer dimensions larger than the opening. With a peripheral edge portion of the opening being sandwiched between an outer peripheral portion of the door body and an outer peripheral portion of the clamp ring, the door body and clamp ring are fastened by fastening members or the like, thereby closing the opening by the door body (see, for example, U.S. Pat. Nos. 4,579,248 and 4,530,443).

Such access doors are often provided at two or more locations. To avoid misassembling an access door to an opening at a wrong location, it is conceivable to form a concave portion in part of the opening in a circumferential direction while forming a convex portion on the outer peripheral portion of the door body and use the concave portion and convex portion as an engaging mechanism.

That is, the concave portions of the openings are provided at circumferential positions differing among the plural openings. Regarding the door bodies to be assembled to the respective openings, convex portions are formed at positions corresponding to the positions of the concave portions of the openings to which the door bodies are assembled. Consequently, when an opening and access door are paired correctly in terms of position, the convex portion can be inserted into the concave portion, allowing the access door to be assembled to the opening. On the other hand, when an opening and access door are combined incorrectly, if an attempt is made to mount the access door to the opening, the positions of the concave portion and convex portion will not match each other, causing the convex portion of the access door to interfere with the opening and thereby disallowing the access door from being assembled to the opening.

However, large forces act on the main wings in flight, causing large elastic deformations of the main wings. Therefore, when a concave portion is formed in the opening, it is likely that stresses will concentrate on part around the concave portion. If thickness of material around the opening is increased to resist the stresses, the weight of the airframe will be increased.

Also, when a concave portion is provided in the opening, it becomes necessary to secure a contact surface between the access door and circumference of the opening on the peripheral side of the concave portion as well. This increases the size of the access door, resulting in an increase in the weight of the access door itself.

SUMMARY OF THE INVENTION

The present invention has been made in view of the technical problems described above and has an object to provide such an airframe of an aircraft and a panel assembly for an aircraft that can prevent misassembly of access doors to openings while reducing stress concentrations.

An airframe of an aircraft according to the present invention comprises at least: a panel which makes up an outer surface of the airframe of the aircraft; a plurality of openings formed in the panel; and a plurality of detachable closure member bodies fitted in the openings to close the openings. In the airframe of the aircraft, each of the closure member bodies is paired with one of the openings to be combined for fitting, each of the openings is provided with a convex portion formed at a location differing for each of the openings and configured to protrude inward in each of the openings, and each of the closure member bodies is equipped with an incorrect fitting detection portion configured to interfere with the convex portions formed in the openings different from the opening paired with the closure member body.

In this way, because the convex portion is formed in each opening and the incorrect fitting detection portion on the side of the closure member body is configured to interfere with the convex portion, any attempt to fit the closure member body in a wrong opening not paired with the closure member body can be detected by an operator. Also, because the convex portion rather than a concave portion is formed in each opening, stresses concentrated on this part can be reduced.

The incorrect fitting detection portion is, for example, a projection formed by protruding on an outer peripheral side of the closure member body, and the projection can be formed at a location offset in a circumferential direction of the closure member body with respect to the convex portion formed in the opening paired with the closure member body.

Consequently, when the closure member body is fitted in the opening paired with the closure member body and designed to be fitted with the closure member body, the convex portion and projection do not interfere with each other. However, when an attempt is made to fit the closure member body in an opening different from the opening paired with the closure member body, the convex portion and projection interfere with each other.

The incorrect fitting detection portion may be an interference wall continuous with the closure member body in the circumferential direction, and a concave portion may be formed on the interference wall to receive the convex portion formed in the opening paired with the closure member body.

Consequently, when the closure member body is fitted in the opening paired with the closure member body, the convex portion is received in the concave portion without interference therebetween. However, when an attempt is made to fit the closure member body in an opening different from the opening paired with the closure member body, the convex portion and interference wall interfere with each other.

The closure member body may be placed on one face side of the panel and have an outer dimension larger than the opening so as to close the opening; and the airframe of the aircraft may further include: a ring-shaped clamp member placed on another face side of the panel and having an outer dimension larger than the opening, and a fastener adapted to fasten the closure member body and the clamp member, with the panel being sandwiched between the closure member body and the clamp member.

Also, the present invention is a panel assembly for an aircraft, the panel assembly comprising at least: a panel which makes up an outer surface of the airframe of the aircraft; a plurality of openings formed in the panel; and a plurality of detachable closure members fitted in the openings to close the openings. In the panel assembly, each of the closure members is paired with one of the openings to be combined for fitting, each of the openings is provided with a convex portion formed at a location differing for each of the openings and configured to protrude inward in the opening, and each of the closure members is provided with an incorrect fitting detection portion configured to interfere with the convex portions formed in the openings different from the opening paired with the closure member.

The incorrect fitting detection portion may be a projection formed by protruding on the outer peripheral side of the closure member, and the projection can be formed at a location offset in a circumferential direction of the closure member with respect to the convex portion formed in the opening paired with the closure member.

The incorrect fitting detection portion may be an interference wall continuous with the closure member in the circumferential direction, and a concave portion may be formed on the interference wall to receive the convex portion formed in the opening paired with the closure member.

Furthermore, each of the closure members may include a closure member body placed on one face side of the panel and having an outer dimension larger than the opening so as to close the opening; a ring-shaped clamp member placed on another face side of the panel and having an outer dimension larger than the opening; and a fastener adapted to fasten the closure member body and the clamp member, with the panel being sandwiched between the closure member body and the clamp member. Also, the panel may be a wing panel.

According to the present invention, because the convex portion is formed in each opening and the incorrect fitting detection portion on the side of each closure member body is configured to interfere with the convex portion, any attempt to fit the closure member body in the openings different from the opening paired with the closure member body can be detected by an operator. Also, because the convex portion rather than a concave portion is formed in each opening, stresses concentrated on this part can be reduced. In this way, the present invention can prevent misassembly of access doors to openings while reducing stress concentrations.

DETAILED DESCRIPTION OF THE PREFERRED EMBODIMENTS

The present invention will be described in detail below with reference to an embodiment shown in the accompanying drawings.

Figure 1:
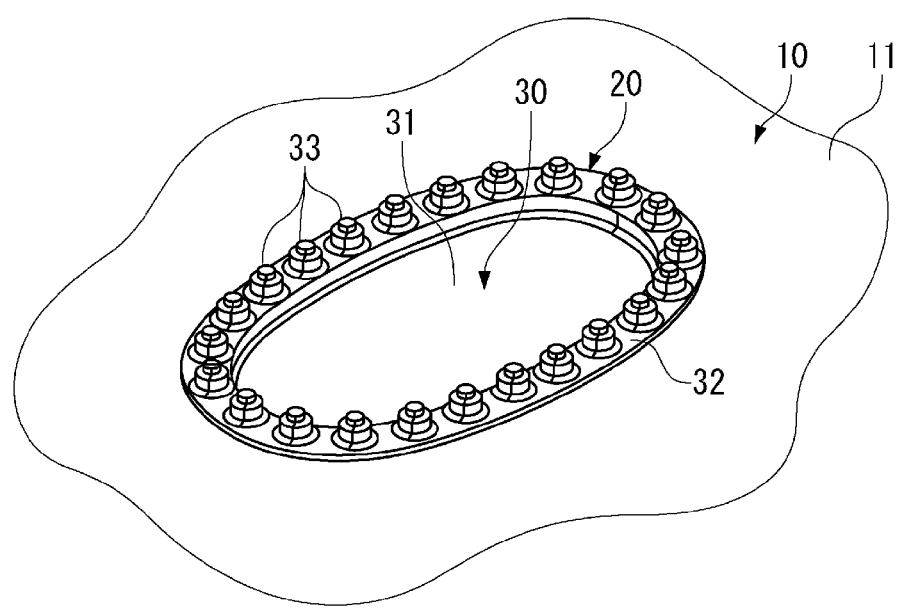
FIG. 1 is a perspective view showing an access door installed on a main wing of an aircraft according to an embodiment of the present invention.

FIG. 1 is a perspective view showing an access door (closure member) 20 installed on a main wing 10 configuring an airframe of an aircraft when viewed from an inner side of the main wing 10, where a closure member for an opening according to the present embodiment is applied to the airframe of the aircraft.

A plurality of access doors 20 are installed on a wing panel (panel) 11 which forms a top-side surface or underside surface of each main wing 10, to allow maintenance personnel to go in and out of fuel tanks installed in inner space of the main wing 10.

Figure 2:
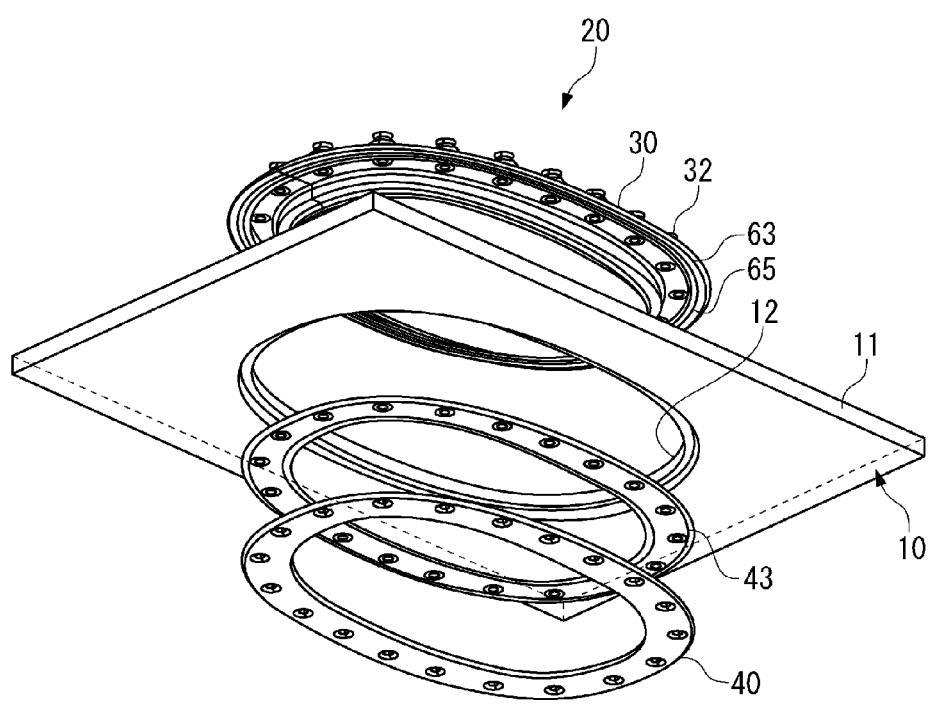
FIG. 2 is a developed perspective view of the access door.
Figure 3:
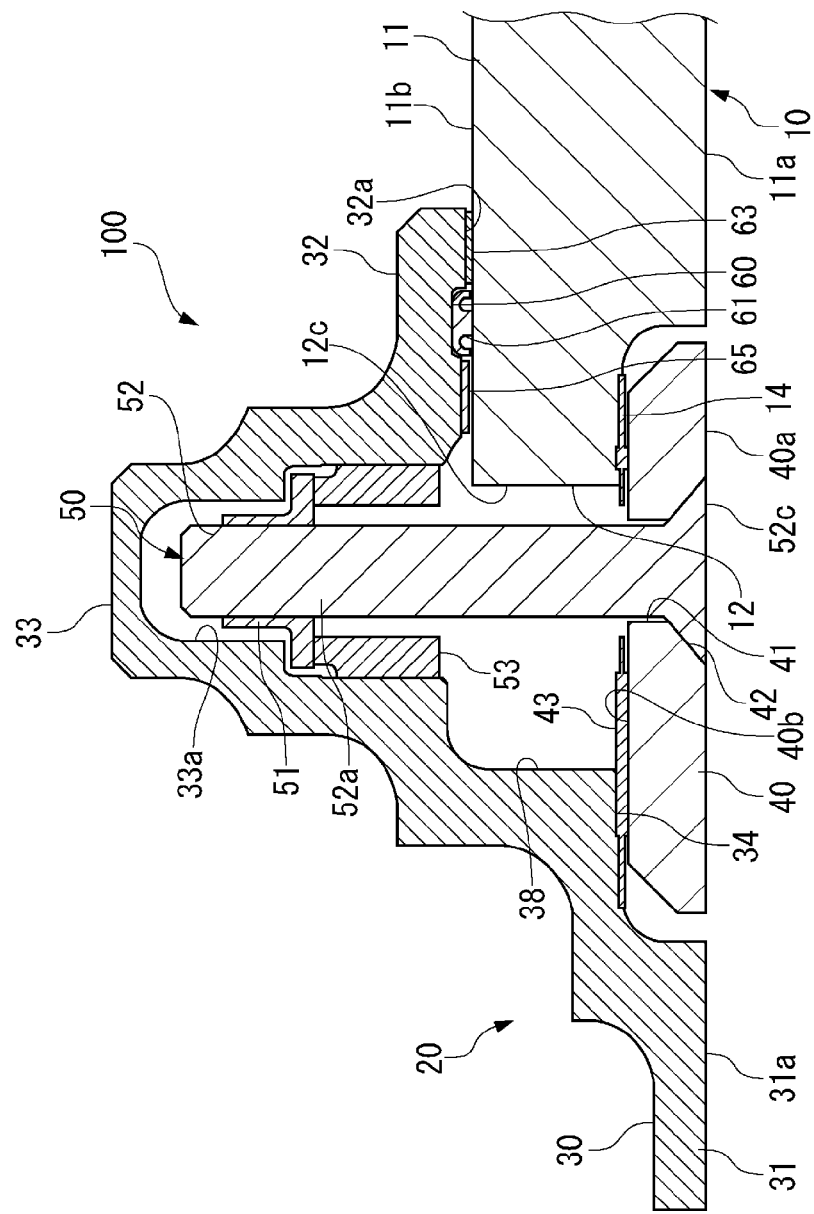
FIG. 3 is a sectional view showing a mounting structure of the access door with respect to a wing panel of the main wing.

As shown in FIGS. 2 and 3, each opening 12 is formed in the wing panel 11, communicating the inside and outside of the main wing 10 with each other. The opening 12 can be formed into an appropriate shape such as oval, elliptic, circular, or the like.

The wing panel 11, opening 12, and access door 20 make up an assembly (panel assembly) 100 of the wing panel 11.

The access door 20 includes a door body (closure member body) 30 placed on an inner-space side of the main wing 10 with respect to the opening 12, a clamp ring (clamp member) 40 placed on an outer side of the main wing 10, and fastening members (fasteners) 50 adapted to fasten the door body 30 and clamp ring 40.

The door body 30 has an outer dimension larger than the opening 12. The door body 30 has an outer surface 31a forming a face continuous with an outer wing surface 11a of the wing panel 11, and includes a plate portion 31 whose outer dimension is smaller than the opening 12, and a flanged portion 32 formed integrally with an outer peripheral portion of the plate portion 31 and configured to abut against a circumference of the opening 12 on an inner-space side of the main wing 10.

The flanged portion 32 includes an abutting surface 32a configured to abut against a circumference of the opening 12 on the inner-space side of the main wing 10 and receiving portions 33 formed in portions facing the clamp ring 40 on an inner side of the abutting surface 32a and configured to receive the fastening members 50.

A plurality of receiving portions 33 are provided at locations corresponding to the locations where the fastening members 50 are placed, being arranged along a circumferential direction in an outer peripheral portion of the door body 30.

Each receiving portion 33 protrudes toward the inner-space side of the main wing 10 and has a concave portion 33a formed which is open toward the clamp ring 40. In the concave portion 33a, a nut 51 configuring the fastening member 50 is held by a retainer 53. Also, a shank 52a of a fastener body 52 configuring the fastening member 50 is received in the concave portion 33a.

The clamp ring 40 has an outer dimension larger than the opening 12. Specifically, the clamp ring 40, which is ring shaped, has an outside diameter larger than the inside diameter of the opening 12, and an inside diameter smaller than the inside diameter of the opening 12. The clamp ring 40 is rectangular in cross section and configured as follows: an outer surface 40a which is on an outer side of the main wing 10 forms a face continuous with the outer wing surface 11a of the wing panel 11, and an opposing surface 40b which faces the receiving portions 33 of the door body 30 are formed in parallel to the outer surface 40a.

At locations corresponding to the receiving portions 33 of the door body 30, through-holes 41 are formed in the clamp ring 40, penetrating the outer surface 40a and opposing surface 40b. The shank 52a of the fastening member 50 is inserted into each through-hole 41. Each through-hole 41 has a tapered seating face 42 formed on the side of the outer surface 40a of the main wing 10 to receive a head 52c of the fastening member 50.

An abutting surface 34 configured to butt against an inner peripheral side of the opposing surface 40b of the clamp ring 40 is formed in the outer peripheral portion of the plate portion 31.

Also, an abutting surface 14 configured to abut against an outer peripheral side of the opposing surface 40b of the clamp ring 40 is formed in an inner peripheral portion of the opening 12 of the wing panel 11.

The clamp ring 40 is mounted in such a way as to abut against the abutting surfaces 14 and 34 via a gasket 43.

In the access door 20 described above, when the opening 12 is closed, an inner peripheral edge portion of the opening 12 is sandwiched between the abutting surface 32a of the flanged portion 32 of the door body 30 and the opposing surface 40b of the clamp ring 40. Then, as the fastener bodies 52 of the fastening member 50 are inserted into the through-holes 41 of the clamp ring 40 from outside the main wing 10 and the shank 52a is screwed into the nut 51, the door body 30 and clamp ring 40 are fastened together.

On the abutting surface 32a of the flanged portion 32 of the door body 30, a ring groove 60 is formed continuously in the circumferential direction of the door body 30. A ring-shaped fuel seal (seal) 61 made of rubber-based material is fitted in the ring groove 60. The fuel seal 61 prevents fuel leakage by being interposed between the flanged portion 32 and an inner wing surface 11b of the wing panel 11.

Being sandwiched between the abutting surface 32a and the inner wing surface 11b of the wing panel 11, annular spacers 63 and 65 which, being made of insulating material, have a predetermined thickness are provided on an inner peripheral side and outer peripheral side of the ring groove 60, respectively.

Each of the plural openings 12 formed in the wing panel 11 is paired with one of the door bodies 30 to be fitted with in correct combination, and the plurality of paired openings 12 and door bodies 30 have the same shape and size. Thus, as shown in FIGS. 4 and 5, to avoid incorrect combinations of openings 12 and door bodies 30, a door-side rib (incorrect fitting detection portion or projection) 70 is provided on each door body 30 and a hole-side convex portion (convex portion) 80 is provided in each opening 12.

Figure 4A:
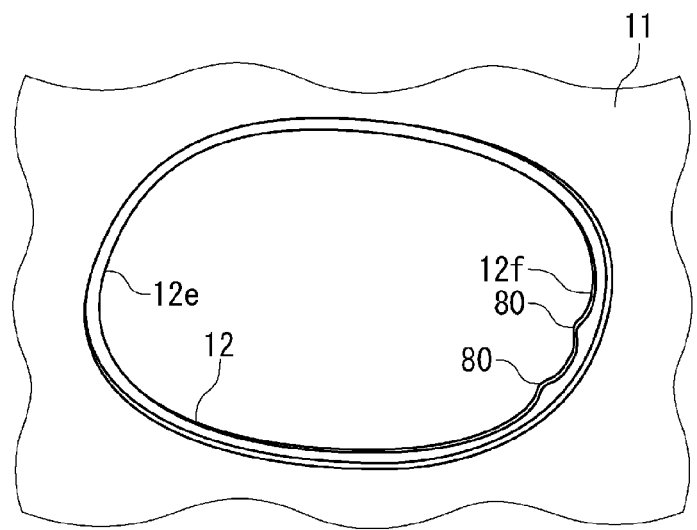
FIGS. 4A and 4B are diagrams showing a hole-side convex portion provided in an opening.
Figure 4B:
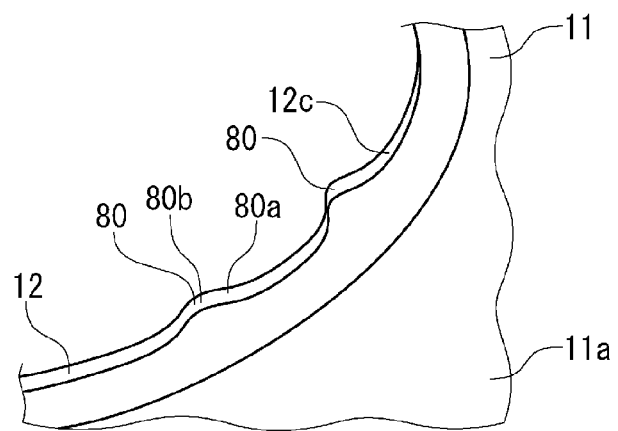

That is, as shown in FIGS. 4A and 4B, the hole-side convex portion 80 is formed in each opening 12 at one or more locations in the circumferential direction. The number and locations of hole-side convex portions 80 are configured to differ among the plural openings 12 formed in the wing panel 11.

The hole-side convex portion(s) 80 is/are formed in each opening 12, protruding inward of the opening 12, i.e., toward the center of the opening 12, from an inner peripheral end face 12c orthogonal to the wing panel 11. The hole-side convex portion 80 is not limited in any way in terms of shape, but preferably the hole-side convex portion 80 is tapered in width from a base portion 80a toward a front end portion 80b and shaped to have a curved surface without any corner as shown in FIG. 4B.

The hole-side convex portion 80 is placed at a location between adjacent fastening members 50, 50 so as not to interfere with the fastening members 50.

Also, when the opening 12 is oval or elliptic, preferably the hole-side convex portion 80 is placed on one or both of two end sides 12e and 12f in a major axis direction of the opening 12.

Figure 5A:
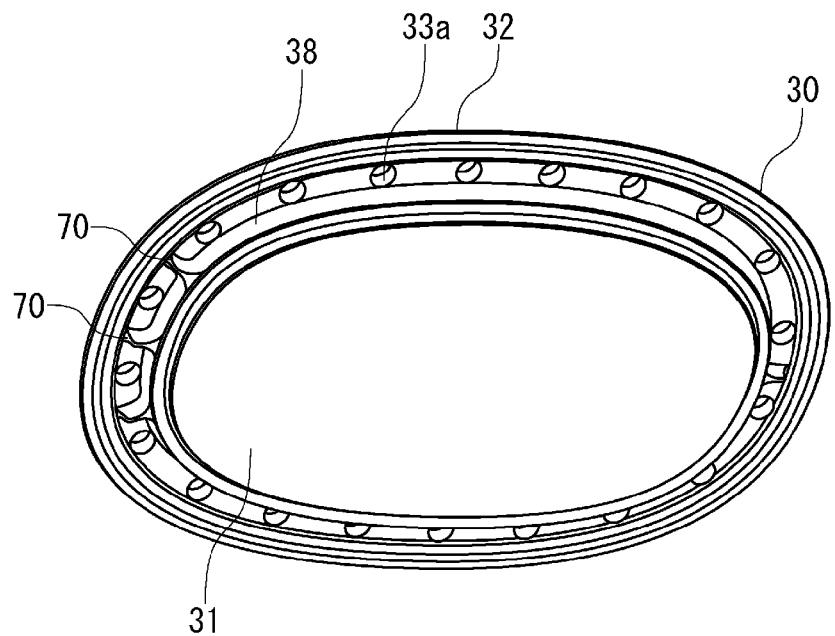
FIGS. 5A and 5B are diagrams showing a door-side rib provided on a door body.
Figure 5B:
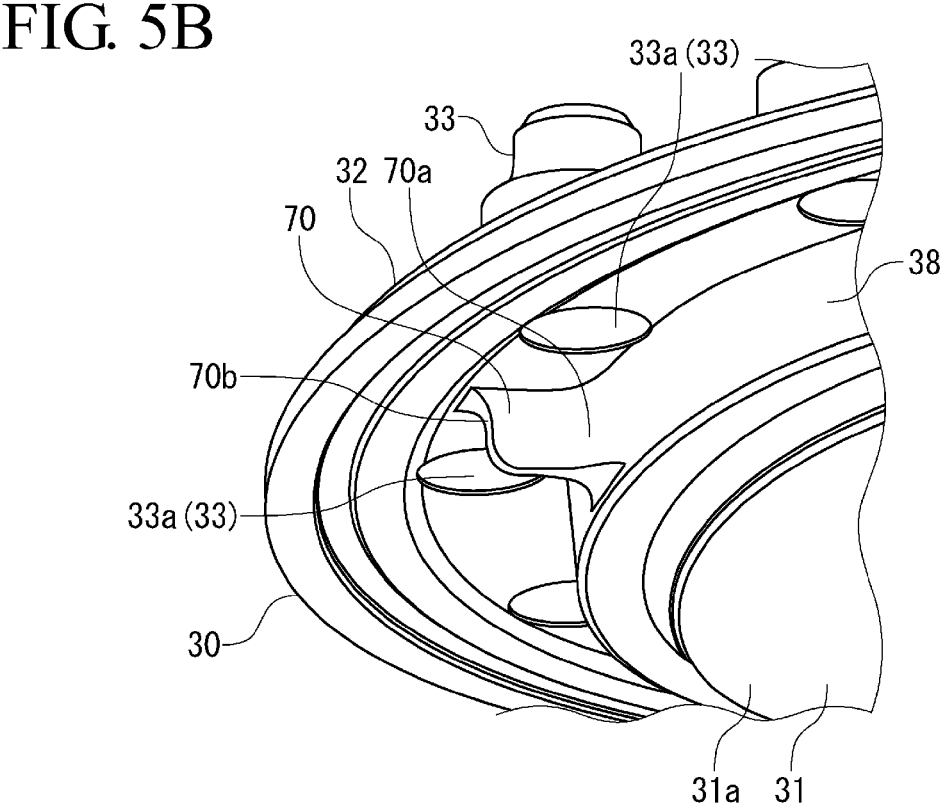

On the door body 30, the door-side rib 70 is formed at one or more locations in the circumferential direction of an opposing surface 38 facing the inner peripheral end face 12c of the opening 12, as shown in FIGS. 5A and 5B. The door-side rib(s) 70 is/are formed, protruding toward outer peripheral side from the opposing surface 38. Each door-side rib 70 is provided at a location offset in a circumferential direction of the opening 12 with respect to the hole-side convex portion 80 formed in the opening 12 to be paired with the door body 30 in correct combination.

The door-side rib 70 may have any shape, but preferably, as shown in FIG. 5B, the door-side rib 70 is tapered in width from a base portion 70a toward a front end portion 70b, and is shaped to have a curved surface without any corner wherever practicable. Each door-side rib 70 is placed at a location between adjacent receiving portions 33, 33 so as not to interfere with the fastening members 50.

Figure 6A:
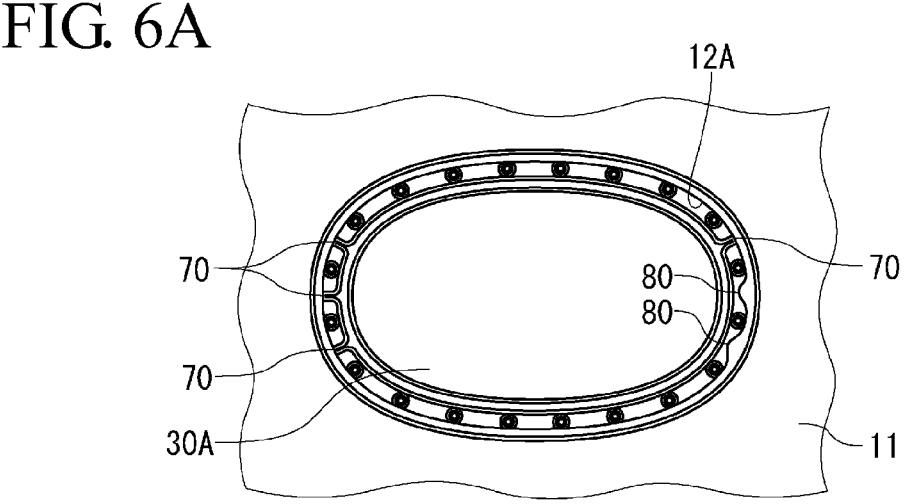
FIGS. 6A to 6C are diagrams showing positional relationship between the hole-side convex portion and door-side rib when plural openings and door bodies are combined correctly.
Figure 6B:
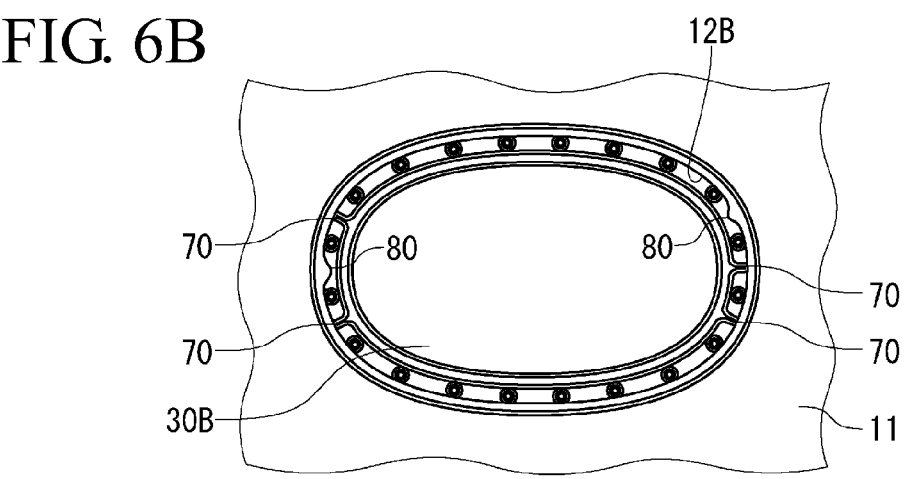
Figure 6C:
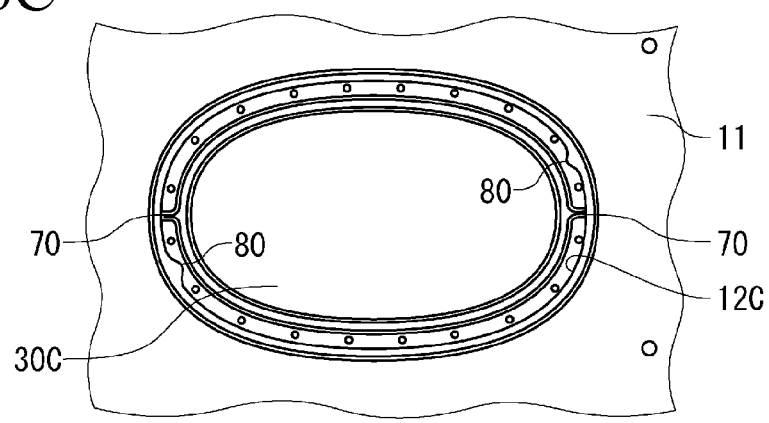

FIGS. 6A to 6C are diagrams showing three examples of combinations between three types of opening 12A to 12C provided with the hole-side convex portions 80 and three types of door body 30A to 30C provided with the door-side ribs 70. The three examples show proper combinations of the openings 12A to 12C and door bodies 30A to 30C (a combination of opening 12A and door body 30A, combination of opening 12B and door body 30B, and combination of opening 12C and door body 30C).

As shown in the examples, the hole-side convex portions 80 formed in the openings 12A to 12C differ in number and location in the circumferential direction among the plural openings 12A to 12C. The door-side ribs 70 formed on the door bodies 30A to 30C are provided in such locations as not to interfere with the hole-side convex portions 80 provided in the openings 12A to 12C, being paired in correct combination with the door bodies 30A to 30C.

Figure 7:
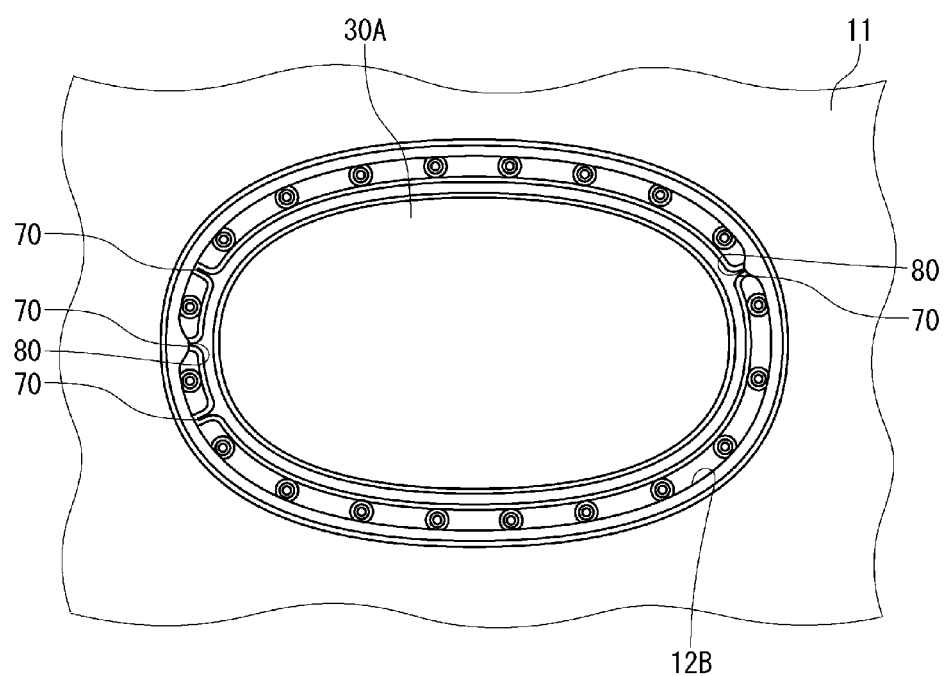
FIG. 7 is a diagram showing how the hole-side convex portion and door-side rib interfere with each other when the opening and door are combined incorrectly.

On the other hand, as shown in FIG. 7, for example, if the opening 12B shown in FIG. 6B is combined incorrectly with the door body 30A shown in FIG. 6A rather than the door body 30B paired with the opening 12B, a front end portion of the door-side rib 70 will interfere with a front end portion of the hole-side convex portion 80 provided in the opening 12B, preventing the very act of mounting the door body 30A in the opening 12B.

Also, in the example shown in FIG. 6A, if an attempt is made to mount the door body 30A in the opening 12A with the door body 30A being rotated by 180 degrees from the illustrated state, the front end portion of the door-side rib 70 will interfere with the front end portion of the hole-side convex portion 80 provided in the opening 12, disabling the mounting.

Accordingly, misassembly of the opening 12 to the door body 30 can be prevented.

Moreover, because the hole-side convex portions 80 rather than concave portions are provided in the openings 12, even if the main wings 10 deform during flight, it is possible to prevent stress concentrations on the openings 12. This makes it possible to increase the strength of the openings 12 and allows the weight of the airframe to be reduced more than when concave portions are provided in the openings 12. Also, the door bodies 30 can be made smaller than when concave portions are provided in the openings 12, making it possible to reduce the weight of the door bodies 30.

Also, the door bodies 30 are reinforced by the door-side ribs 70, and the weight of the door bodies 30 can be reduced accordingly.

Figure 8:
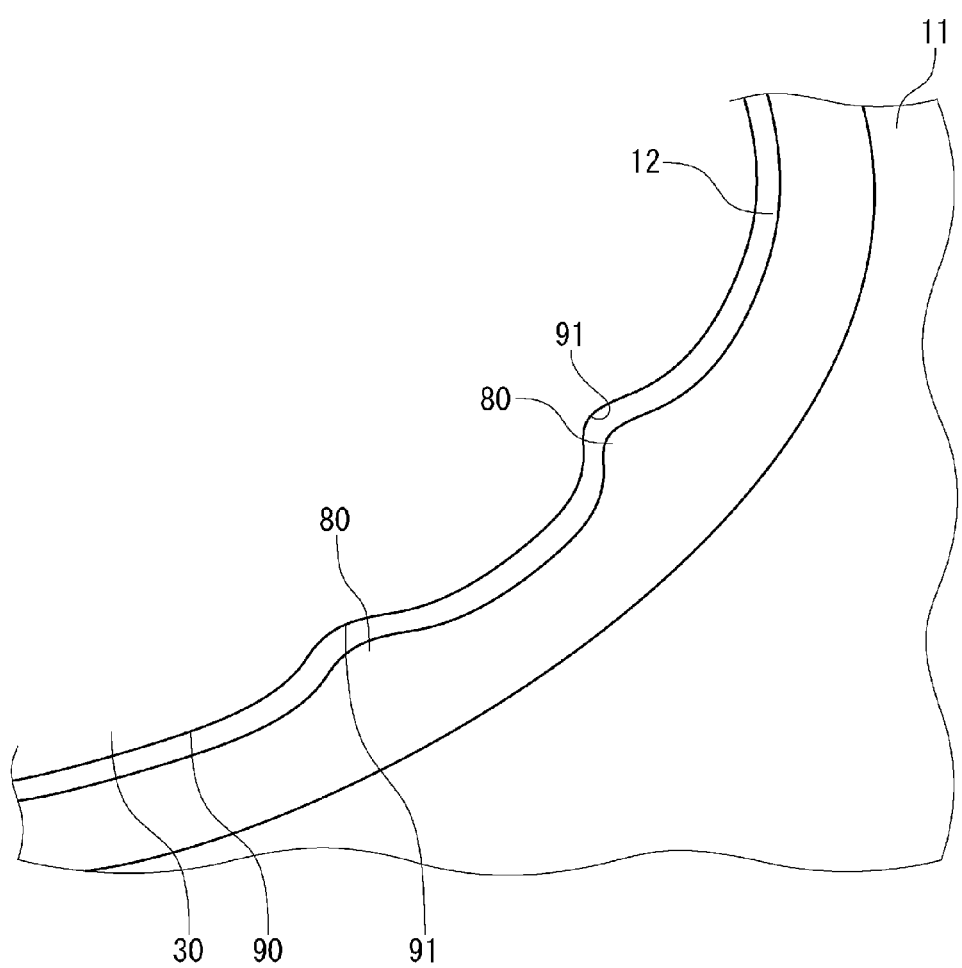
FIG. 8 is a diagram showing an example in which an interference wall and concave portion are formed instead of the door-side rib.

Although in the above embodiment, misassembly of the opening 12 to the door body 30 is detected as the door-side rib 70 on the side of the door body 30 interferes with the hole-side convex portion 80 provided in the opening 12, an interference wall (incorrect fitting detection portion) 90 continuing in the circumferential direction may be provided on the side of the door body 30 and a receiving recess (concave portion) 91 adapted to receive the hole-side convex portion 80 may be provided in the interference wall 90, as shown in FIG. 8. In that case, any misassembly will cause the hole-side convex portion 80 on the side of the opening 12 to interfere with the interference wall 90, resulting in inability to assemble (mount) the door body 30 to the opening 12.

Although the door body 30 and clamp ring 40 have been described in the above embodiment, the fastening structure, shapes, and the like of the door body 30 and clamp ring 40 are in no way intended to be limited to those described above, and may be configured otherwise as appropriate.

Besides, some of the components cited in the above embodiment may be left out or changed to other configuration as appropriate without departing from the spirit of the present invention.

REFERENCE SIGNS LIST

10: main wing (airframe)
11: wing panel (panel)
12: opening
20: access door (closure member)
30: door body (closure member body)
31: plate portion
31a: outer surface
32: flanged portion
38: opposing surface
40: clamp ring
50: fastening member (fastener)
70: door-side rib (incorrect fitting detection portion, projection)
80: hole-side convex portion (convex portion)
90: interference wall
91: receiving recess (concave portion)
100: panel assembly

What is claimed is:

1. An airframe of an aircraft, the airframe comprising at least:
    a panel which makes up an outer surface of the airframe;
    a plurality of openings formed in the panel; and
    a plurality of detachable closure member bodies fitted in the openings to close the openings,
    wherein each of the closure member bodies is paired with one of the openings to be combined for fitting,
    each of the openings is provided with a convex portion formed at a location differing for each of the openings and configured to protrude inward in each of the openings, and
    each of the closure member bodies is provided with an incorrect fitting detection portion configured to interfere with the convex portions formed in the openings different from the opening paired with the closure member body.

2. The airframe of an aircraft according to claim 1, wherein the incorrect fitting detection portion is a projection formed by protruding on an outer peripheral side of the closure member body, and the projection is formed at a location offset in a circumferential direction of the closure member body with respect to the convex portion formed in the opening paired with the closure member body.

3. The airframe of an aircraft according to claim 1, wherein the incorrect fitting detection portion is an interference wall continuous with the closure member body in the circumferential direction, and a concave portion is formed on the interference wall to receive the convex portion formed in the opening paired with the closure member body.

4. The airframe of an aircraft according to claim 1, wherein:
    the closure member body is placed on one face side of the panel and has an outer dimension larger than the opening so as to close the opening; and
    the airframe further includes:
        a ring-shaped clamp member placed on another face side of the panel and has an outer dimension larger than the opening, and
        a fastener adapted to fasten the closure member body and the clamp member, with the panel being sandwiched between the closure member body and the clamp member.

5. A panel assembly for an aircraft, the panel assembly comprising:
    a panel which makes up an outer surface of the airframe of the aircraft;
    a plurality of openings formed in the panel; and
    a plurality of detachable closure members fitted in the openings to close the openings,
    wherein each of the closure members is paired with one of the openings to be combined for fitting,
    each of the openings is provided with a convex portion formed at a location differing for each of the openings and configured to protrude inward in the opening, and
    each of the closure members is provided with an incorrect fitting detection portion configured to interfere with the convex portions formed in the openings different from the opening paired with the closure member.

6. The panel assembly for an aircraft according to claim 5, wherein the incorrect fitting detection portion is a projection formed by protruding on an outer peripheral side of the closure member, and the projection is formed at a location offset in a circumferential direction of the closure member with respect to the convex portion formed in the opening paired with the closure member.

7. The panel assembly for an aircraft according to claim 5, wherein the incorrect fitting detection portion is an interference wall continuous with the closure member in the circumferential direction, and a concave portion is formed on the interference wall to receive the convex portion formed in the opening paired with the closure member.

8. The panel assembly for an aircraft according to claim 5, wherein each of the closure members includes:
    a closure member body placed on one face side of the panel and having an outer dimension larger than the opening so as to close the opening;
    a ring-shaped clamp member placed on another face side of the panel and having an outer dimension larger than the opening; and
    a fastener adapted to fasten the closure member body and the clamp member, with the panel being sandwiched between the closure member body and the clamp member.

9. The panel assembly for an aircraft according to claim 5, wherein the panel is a wing panel.

* * * * *